July 13, 1948.  J. E. HARGRAVE ET AL  2,445,265
DETACHABLE HANDLE
Filed Aug. 31, 1946

INVENTORS
JOHN EDWARD HARGRAVE
EDWARD GEORGE CHAMBERLAIN
BY Otto Munk
THEIR ATTY Patented July 13, 1948

2,445,265

UNITED STATES PATENT OFFICE 2,445,265

DETACHABLE HANDLE

John Edward Hargrave, Sublime Point Kiosk, Thirroul, and Edward George Chamberlain, Thirroul, Australia Application August 31, 1946, Serial No. 694,178
In Australia October 15, 1945

1 Claim. (Cl. 294—31)

This invention relates to improvements in detachable handles for cans such as ice cream containers and kerosene and petrol cans.

An object of the present invention is to devise a handle of the above nature which is readily attached and detached from the can and one wherein a more secure and uniform grip of the can is obtained.

According to the invention in its application to ice cream cans, means are provided whereby the can is engaged at diametrically opposite points by a pair of gripping members pivoted at their upper ends to a toggle lifting handle.

Each gripping member has a lower can engaging portion which is hooked and slotted to pass over the can edge and has an upper portion disposed at an angle to the said lower portion. The said respective upper portions are connected by a handle in the form of a toggle lever, the members of which are pivoted together and also to the upper portion of the respective gripping members. One of the toggle levers is of channel formation and is adapted to receive the other toggle member when the device is in the carrying position.

In a modification of the invention for use as a handle for converting kerosene and like tins into temporary buckets, each of the gripping members is pivoted medially to a respective vertical member and has a pivot adapted to be forced into a recess in the metal constituting the upper portion of the sides of a kerosene or like can, within which the said vertical members are inserted by a transverse member which connects them at the top and serves as a handle.

In order that the invention may be more readily understood, reference will now be made to the accompanying drawings wherein—

Figure 1:
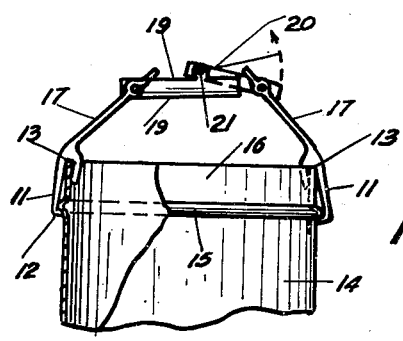
Figure 1 is a part sectional elevation illustrating the application of the invention to an ice cream can.
Figure 2:
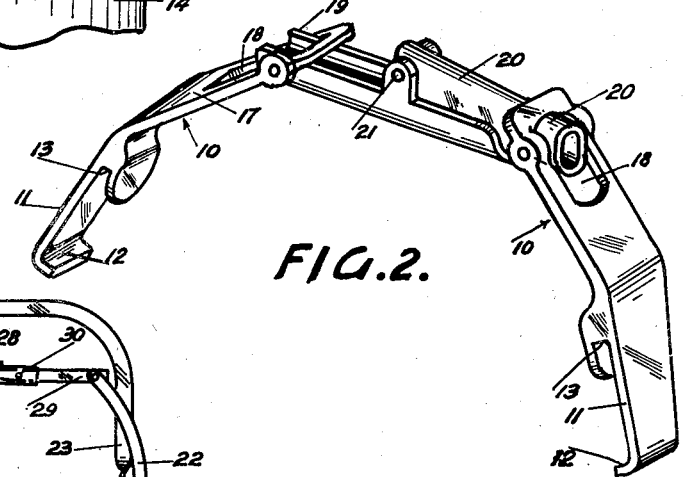
Figure 2 is a perspective view of the form of the invention seen in Figure 1.

Referring to Figures 1 and 2, the gripping members 10 have a can engaging portion 11 having a hook end 12 and a slot 13, the hooked end 12 being adapted to be pressed inwardly so as to engage the body 14 of the can below the head 15, while the said slot 13 engages the rim 16 of the said can body 14.

The respective upper portions 17 of the gripping members 10 are disposed at an angle to the said can engaging portion 11; the said respective upper portions 17 of the gripping members 10 have slots 18 within which one end of respective toggle members 19, 20 is pivoted, the respective toggle members 19, 20 are pivoted medially upon a pivot 21 and serve as a handle for lifting purposes. In this form of the invention, the toggle member 19 is channeled to receive the toggle member 20 when in the carrying position.

Figure 3:
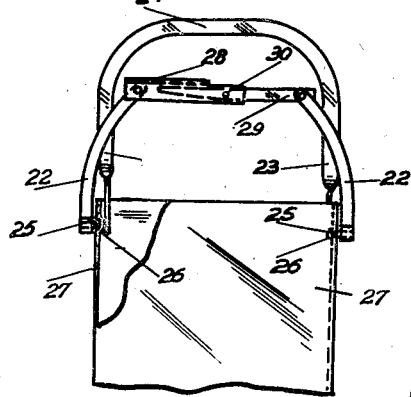
Figure 3 is a part sectional elevation of a form of the invention suitable for use as a handle for a kerosene can bucket.
Figure 4:
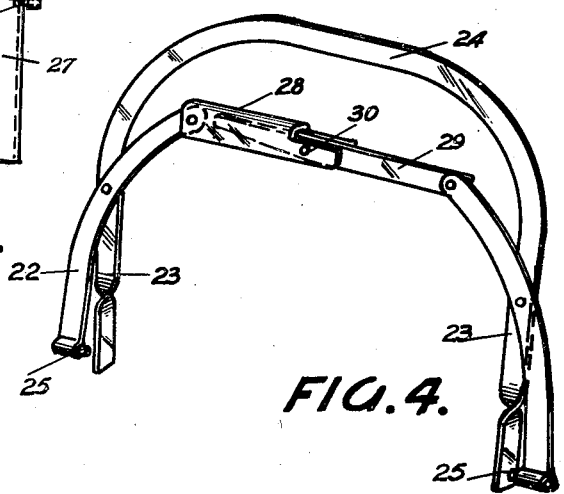
Figure 4 is a perspective view of the form of the invention seen in Figure 3.

In the form of the invention seen in Figures 3 and 4 each of the gripping members 22 is pivoted medially to respective vertical members 23 which as illustrated are connected by a loop portion 24, said gripping members 22 each having a pivot 25 adapted to be forced into a recess 26 in the metal constituting the upper portion of the sides of the can 27.

The upper ends of the respective gripping members 22 are pivoted to respective toggle members 28 and 29, which are pivoted medially by a pin 30 and serve as a handle for lifting the can.

We claim:

An improved detachable handle for cans, comprising a pair of can engaging members each having a hooked end and a slot medially thereof and having their upper ends bent inwardly from the said hooked ends, said upper ends being slotted, a channelled toggle portion pivoted to one of the can engaging members and having a pair of lugs, and a second toggle portion pivoted to the other of the can engaging members and also pivoted to the said lugs of the channelled toggle portion.

JOHN EDWARD HARGRAVE.
EDWARD GEORGE CHAMBERLAIN.

REFERENCES CITED

The following references are of record in the file of this patent:

UNITED STATES PATENTS

| Number | Name | Date |
|---|---|---|
| 576,461 | Louden | Feb. 2, 1897 |
| 1,569,126 | Hill | Jan. 12, 1926 |
| 1,618,568 | Carlson | Feb. 22, 1927 |
| 1,973,568 | Keith | Sept. 11, 1934 |
| 1,988,107 | Berkowitz | Jan. 15, 1935 |
| 2,349,531 | Weir | May 23, 1944 |